United States Patent
Lee et al.

(10) Patent No.: US 7,953,371 B2
(45) Date of Patent: May 31, 2011

(54) LOCAL WIRELESS COMMUNICATION MODULE COMBINED WITH ANTENNA AND MOBILE TERMINAL HAVING THE SAME

(75) Inventors: Sang Tae Lee, Seongnam-si (KR); Jae Hyou Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 886 days.

(21) Appl. No.: 11/854,452

(22) Filed: Sep. 12, 2007

(65) Prior Publication Data

US 2008/0081614 A1    Apr. 3, 2008

(30) Foreign Application Priority Data

Oct. 2, 2006    (KR) .................... 10-2006-0096901

(51) Int. Cl.
*H04B 7/00* (2006.01)
(52) U.S. Cl. ............... 455/41.2; 455/557; 455/575.1
(58) Field of Classification Search .......... 455/41.1, 455/41.2, 41.3, 550.1, 552.1, 553.1, 556.1, 455/557, 426.1, 575.1, 575.2, 575.6, 575.7; 381/370, 374, 376; 320/112, 114
See application file for complete search history.

(56) References Cited

U.S. PATENT DOCUMENTS 7,629,767 B2 * 12/2009 Kang ........................ 320/112
2005/0101342 A1 * 5/2005 Chuang .................... 455/550.1

FOREIGN PATENT DOCUMENTS

| JP | 2006-067254 | 3/2006 |
| KR | 102004000703 | 1/2004 |
| KR | 102004003514 | 4/2004 |
| KR | 102005005670 | 6/2005 |
| KR | 102006002543 | 3/2006 |

* cited by examiner

*Primary Examiner* — Lana N Le
*Assistant Examiner* — Ping Y Hsieh
(74) *Attorney, Agent, or Firm* — The Farrell Law Firm, P.C.

(57) ABSTRACT

A mobile terminal having a local wireless communication module combined with an antenna is disclosed that eliminates the inconvenience of carrying a data cable for connecting of a mobile terminal to a computer and enabling easy connection of the mobile terminal to a computer whenever necessary. A local wireless communication module combined with an antenna for a mobile terminal Is provided that is usable as an RF communication antenna when joined to a USB socket of the mobile terminal or as a local wireless communication module for executing local wireless communication between the mobile terminal and a computer when detached from the mobile terminal and joined to a USB socket of the computer.

18 Claims, 4 Drawing Sheets

LOCAL WIRELESS COMMUNICATION MODULE COMBINED WITH ANTENNA AND MOBILE TERMINAL HAVING THE SAME

PRIORITY

This application claims priority to an application entitled "LOCAL WIRELESS COMMUNICATION MODULE COMBINED WITH ANTENNA AND MOBILE TERMINAL HAVING THE SAME" filed in the Korean Intellectual Property Office on Oct. 2, 2006 and assigned Serial No. 2006-96901, the contents of which are incorporated herein by reference.

BACKGROUND OF THE INVENTION

1. Field of the Invention

The present invention relates to a mobile terminal, and, more particularly, to a local wireless communication module combined with an antenna and a mobile terminal having the same.

2. Description of the Related Art

With rapid development in communication technology, mobile voice communication can be conducted, essentially without restriction of time and place. Additionally, with an increased memory capacity of mobile terminals, various functions, such as character data, image data, MP3 data, and games, are provided to a user. The mobile terminal may include a mobile communication terminal, Personal Digital Assistant (PDA), and Portable Multimedia Player (PMP).

The mobile terminal may be connected to a desktop computer or a notebook computer using a data cable, and data or programs may thereby be transmitted through the data cable.

For this, a conventional mobile terminal requires a data cable for connection to a computer. However, carrying a data cable all times is inconvenient.

If both the mobile terminal and the computer are digital devices supporting wireless communication, desired data or programs may be easily transmitted. However, in this case, an inconvenient authentication process is necessary for connection between the mobile terminal and the computer.

SUMMARY OF THE INVENTION

The present invention has been made in view of the above problems, and an object of the present invention is to eliminate an inconvenience of carrying a data cable for connecting of a mobile terminal to a computer.

Another object of the present invention is to enable easy connection of a mobile terminal to a computer whenever necessary.

In order to achieve the above objects, the present invention provides a local wireless communication module combined with an antenna for a mobile terminal, for use as an RF communication antenna when connected to a Universal Serial Bus (hereinafter USB) socket of the mobile terminal or as a local wireless communication module for executing local wireless communication between the mobile terminal and a computer when detached from the mobile terminal and connected to a USB socket of the computer.

A local wireless communication module combined with an antenna for a mobile terminal having a first local wireless communication module according to the present invention includes a USB connector; a Radio Frequency (hereinafter RF) antenna for transmitting and receiving an RF signal when the USB connecter is joined to a USB socket of the mobile terminal; a second local wireless communication module for executing local wireless communication between the mobile terminal and a computer when the USB connector is detached from the mobile terminal and joined to a USB socket of the computer; and a switch for connecting the USB connector to the RF antenna or to the second local wireless communication module according to whether the USB connector is joined to the USB socket of the mobile terminal or detached from the USB socket of the mobile terminal.

The local wireless communication module combined with an antenna preferably further includes a local wireless communication antenna connected to the second local wireless communication module. The switch, RF antenna, second local wireless communication module, and local wireless communication antenna are preferably protected by a module body. The USB connector preferably protrudes outside of the module body with a predetermined length.

A mobile terminal according to another embodiment of the present invention includes a USB socket; a terminal body installed with a first local wireless communication module; and a local wireless communication module combined with an antenna, having a USB connector able to be joined to the USB socket of the mobile terminal body. The local wireless communication module combined with an antenna includes a USB connector; an RF antenna for transmitting and receiving an RF signal when the USB connecter is joined to the USB socket of the mobile terminal; a second local wireless communication module for executing local wireless communication between the mobile terminal and a computer when the USB connector is detached from the mobile terminal and joined to a USB socket of the computer; and a switch for connecting the USB connector to the RF antenna or to the second local wireless communication module according to whether the USB connector is joined to the USB socket of the mobile terminal or detached from the USB socket of the mobile terminal.

The terminal body preferably includes a first terminal body having the USB socket of the mobile terminal and the first local wireless communication module; and a second terminal body joined to the first terminal body, and having a display unit. Alternatively, the terminal body includes the first terminal body having a first local wireless communication module; and a second terminal body joined to the first terminal body, and having a display unit and the USB socket of the mobile terminal. As another alternative, the terminal body includes a first terminal body having the USB socket of the mobile terminal; and a second terminal body joined to the first terminal body, and having a display unit and the first local wireless communication module. In another alternative, the terminal body includes a first terminal body; and a second terminal body joined to the first terminal body, and having a display unit, the USB socket of the mobile terminal, and the first local wireless communication module. The USB socket may be formed on the outer surface of the terminal body.

The mobile terminal preferably further includes a cover for surrounding the USB socket of the terminal body. The mobile terminal can be either bar type terminal, flip type terminal, folder type terminal, slide type terminal, and swing type terminal.

The terminal body preferably generates an alarm if the local wireless communication module combined with an antenna is detached and displaced further than a predetermined distance from the terminal body. The terminal body generates an alarm if sensitivity of local wireless communication between the terminal body and the local wireless communication module combined with an antenna is less than a predetermined level. The predetermined distance may be one meter.

BRIEF DESCRIPTION OF THE DRAWINGS

The above and other objects, features and advantages of the present invention will become more apparent from the following detailed description in conjunction with the accompanying drawings, in which.

DETAILED DESCRIPTION OF PREFERRED EMBODIMENTS

Hereinafter, preferred embodiments of the present invention are described in detail with reference to the accompanying drawings. The same reference numbers are used throughout the drawings to refer to the same or like parts. Detailed descriptions of constructions or processes known in the art may be omitted to avoid obscuring the subject matter of the present invention.

Figure 1:
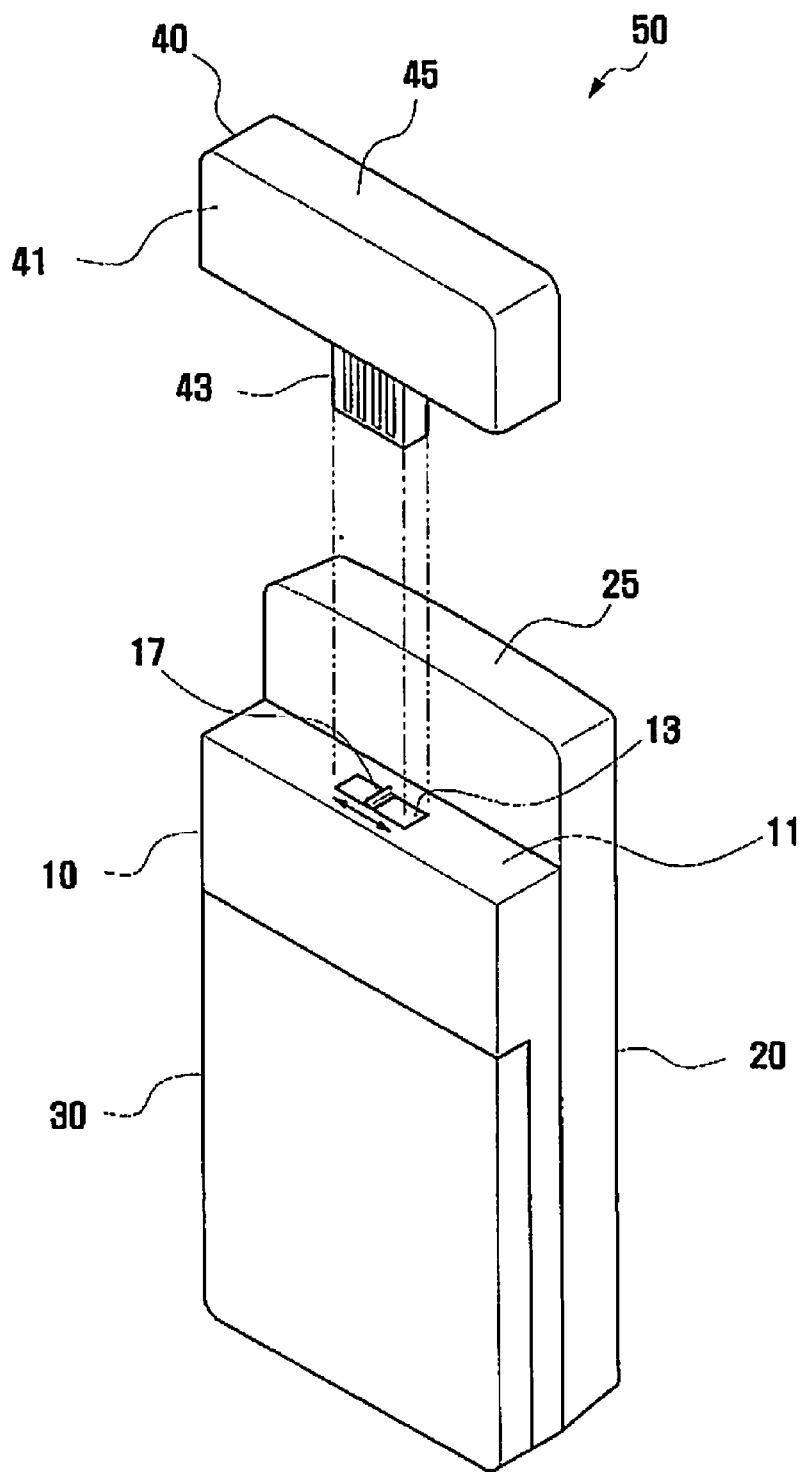
FIG. 1 is a schematic view showing a mobile terminal having a local wireless communication module combined with an antenna according to the present invention.
Figure 2:
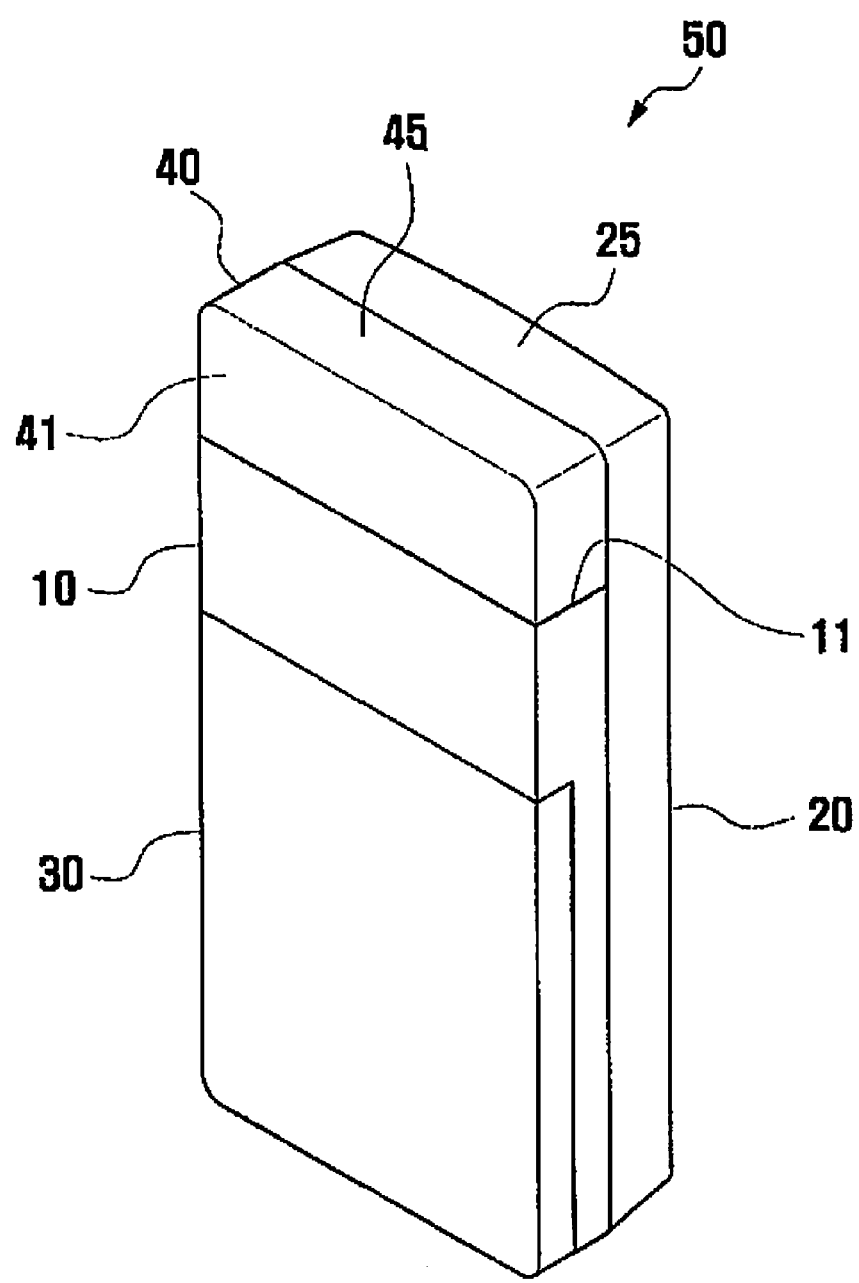
FIG. 2 is a schematic view showing an assembled state of the mobile terminal shown in FIG. 1.
Figure 3:
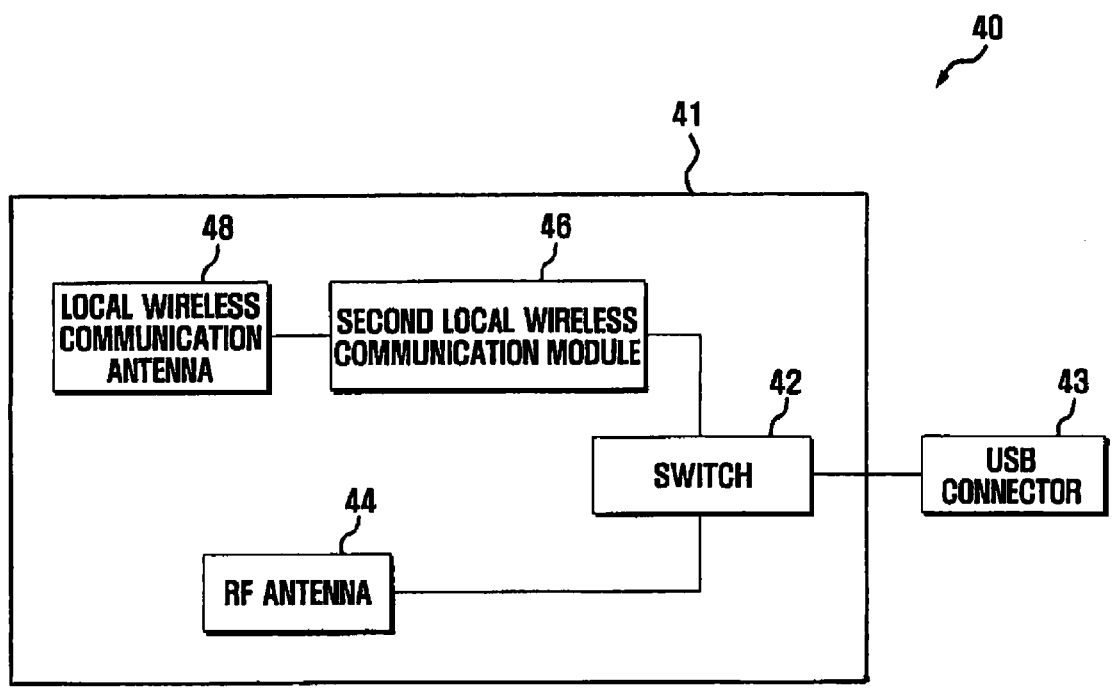
FIG. 3 is a block diagram showing a configuration of the local wireless communication module combined with the antenna shown in FIG. 1.

FIG. 1 is a schematic view showing a mobile terminal 50 having a local wireless communication module 40 combined with an antenna according to the present invention. FIG. 2 is a schematic view showing an assembled state of the mobile terminal 50 shown in FIG. 1. FIG. 3 is a block diagram showing a configuration of the local wireless communication module 40 combined with the antenna shown in FIG. 1.

In FIGS. 1 to 3, the mobile terminal 50 is shown as a sliding type mobile terminal that includes terminal bodies 10 and 20 and the local wireless communication module 40 (hereinafter 'module') combined with an antenna. The module 40 is detachably installed onto the terminal bodies 10 and 20. The mobile terminal has a USB socket 13 and a first local wireless communication module (not shown). A local wireless communication protocol enabling communication between the module 40 and the mobile terminal may be selected from Bluetooth, Zigbee, infrared, UWB (Ultra Wide Band), NFC (Near Field Communication), and Rubee.

The mobile terminal bodies are configured with a first terminal body 10, with a second terminal body 20 joined to and slidably moving along the first terminal body 10.

The first terminal body 10 includes a PCB (Printed Circuit Board) mounted with the first local wireless communication module and the USB socket 13 electrically connected to the PCB. A key input unit 15 (FIG. 4) is formed at a surface of the first terminal body 10 facing towards the second terminal body 20, and a battery pack 30 for supplying electric power to the mobile terminal 50 is installed at an opposite surface of the first terminal body 10.

The second terminal body 20 includes a display unit 21 installed on a surface of the second terminal body 20 on a side opposite to another side that faces towards the first terminal body 10 and a navigation key 23 installed under the display unit 21. The second terminal body 20 covers the key input unit 15 by sliding towards the first terminal body 10, and uncovers the key input unit 15 by sliding away from the first terminal body 10.

The module 40 includes a module body 41 and a USB connector 43 protruding from one surface of the module body 41 by a predetermined length. The module body 41 includes a switch 42, RF antenna 44, second local wireless communication module 46, and local wireless communication antenna 48. The module 40 provided with the mobile terminal 50 as a package may be supplied to a user after completing authentication for local wireless communication, or the user may execute the authentication after receiving the mobile terminal 50.

The surface of the module 40 furthest from the first terminal body 10 when the module 40 is joined therewith is a module upper surface 45, which may be formed such that the module upper surface 45 is located at the same level as a second terminal body upper surface 25 when the second terminal body 20 is fully slid towards and installed in the first terminal body 20. If the module upper surface 45 is higher than the second terminal body upper surface 25 when the module 40 is joined to the first terminal body 10, the USB connector 43 may be damaged by an external force applied from the second terminal body upper surface 25 to the module 40. However, If sufficient connection strength between the first terminal body 10 and the module 40 is secured, the module 40 may be designed such that the module upper surface 45 is higher than the second terminal body upper surface 25.

The USB connector 43 is formed such that the USB connector 43 conforms with and may easily be joined to the USB socket 13. Although a USB connector is shown in the figure as an exposed connection, the USB connector 43 may be formed with a cover surrounding the connection part. The USB connector 43 shown with the exposed connection part minimizes the thickness of the mobile terminal 50.

According to the connection state of the USB connector 43 with the USB socket 13 of the first terminal body 10, the switch 42 connects the USB connector 43 to one of the RF antenna 44 and the second local wireless communication module 46. That is, if the USB connector 43 is joined to the USB socket 13 of the first terminal body 10, the switch 42 connects the USB connector 43 to the RF antenna 44. If the USB connector 43 is detached from the USB socket 13 of the first terminal body 10, the switch 42 connects the USB connector 43 to the second local wireless communication module 46.

The RF antenna 44 is connected to the USB connector 43 through the switch 42, and receives an RF signal when the USB connector 43 is joined to the USB socket 13 of the first terminal body 10.

The second local wireless communication module 46 is connected to the USB connector 43 through the switch 42, and performs local wireless communication between a computer and the mobile terminal 50 when the USB connector 43 is detached from the USB socket 13 of the first terminal body 10 and joined to a USB socket of the computer.

Transmission and reception of a signal for local wireless communication is performed through the local wireless communication antenna 48 connected to the second local wireless communication module 46. The RF antenna 44 and the local wireless communication antenna 48 may be installed together or may be separately installed.

Accordingly, if the module 40 is joined to the USB socket 13 of the first terminal body 10, the module 40 is used as an RF antenna, and if the module 40 is detached from the USB socket 13 of the first terminal body 10 and joined to a computer USB socket, the module 40 is used as a communication module for performing local wireless communication between the mobile terminal 50 and the computer.

In addition, an alarm is generated when the module 40 detached from the mobile terminal body 50 moves further than a predetermined distance away from the mobile terminal 50. The distance between the mobile terminal 50 and the module 40 may be indirectly identified by checking sensitivity of radio reception, because the sensitivity of radio reception differs according to the distance between the mobile terminal 50 and the module 40. Accordingly, the alarm is generated by the mobile terminal 50 when the sensitivity of radio reception is less than a predetermined limit value. The limit value of the sensitivity preferably corresponds to a distance of one meter between the mobile terminal 50 and the module 40. The alarm may be generated by using a sound or vibration that can be output by the mobile terminal 50. The purpose of generating an alarm is to prevent the detached module 40 from being lost.

Additionally, the mobile terminal 50 may further include a cover 17 for protecting the exposed USB socket 13 from contamination by dust or other contaminants when the module 40 is detached from the first terminal body 10. The cover 17 may be formed on the first terminal body upper surface 11 such that the entrance of the USB socket 13 may be covered or uncovered.

In addition to the above-described embodiment, those of skill in art will recognize that the first local wireless communication module or the USB socket 13 may be installed in the second terminal body 20, and that the USB socket 13 may be formed at another location of the first terminal body 10 and the second terminal body 20 where an installation space is available. However, the USB socket 13 is preferably formed on the first terminal body upper surface 11 or on the second terminal body upper surface 25, allowing use of the module 40 as an RF antenna 44 when joined to the first terminal body 10 or the second terminal body 20.

Those of skill in the art will recognize that the present invention may also be applied to a mobile terminal of a bar type terminal, flip type terminal, or swing type terminal.

Figure 4:
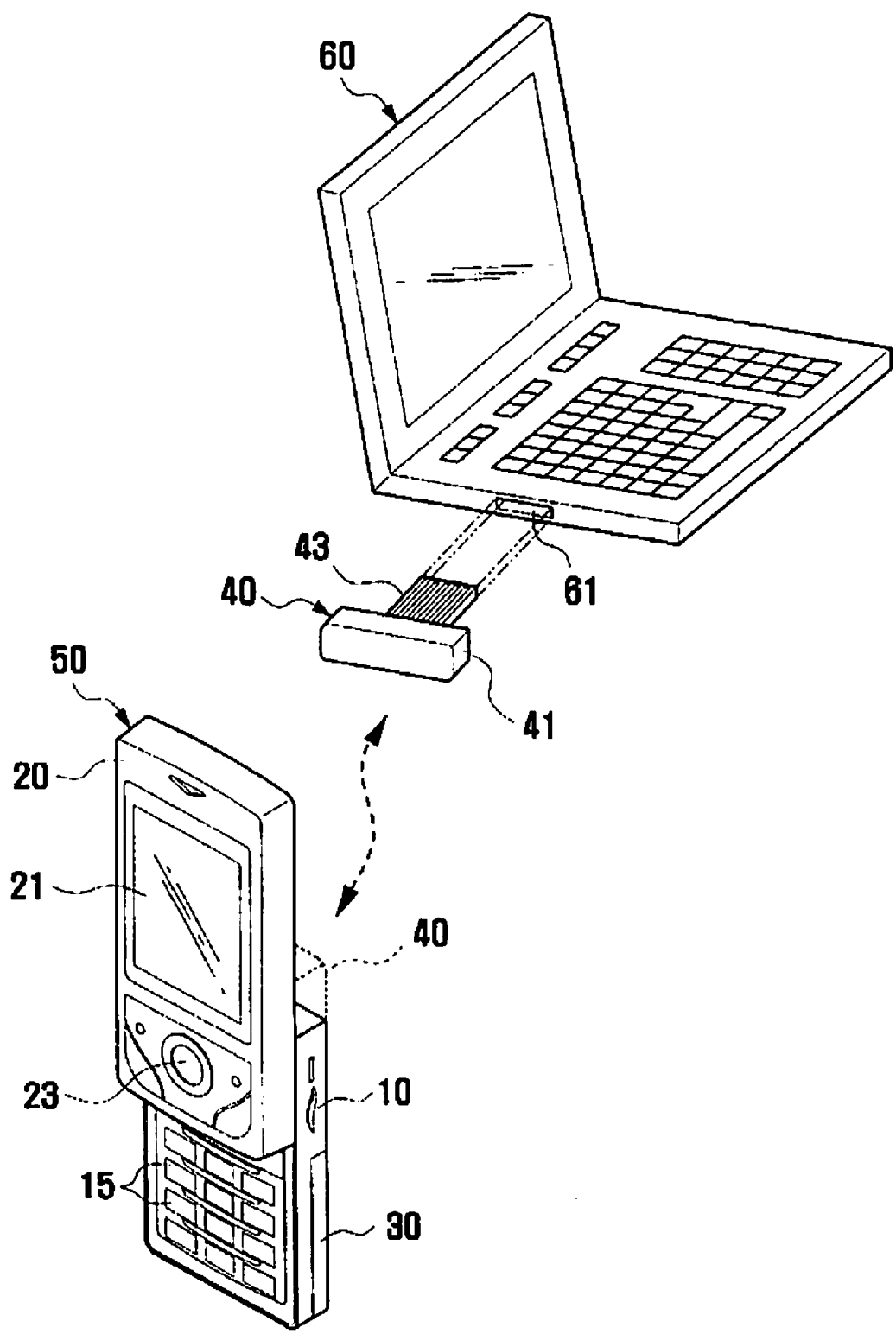
FIG. 4 is a schematic view showing an environment of a local wireless communication between a computer and the mobile terminal having a local wireless communication module combined with the antenna shown in FIG. 1.

FIG. 4 is a schematic view showing an environment of a local wireless communication between a computer 60 and the mobile terminal 50 having the local wireless communication module 40 combined with the antenna. The module 40 is normally joined to the first terminal body 10, and the mobile terminal 50 is used as a mobile communication terminal for transmitting and receiving an RF signal through the RF antenna 44 of the module 40.

When data transmission between the mobile terminal 50 and the computer 60 is required, a local wireless communication environment may be provided by using the module 40 of the mobile terminal 50. For this, the module 40 is detached from the first terminal body 10 and the USB connector 43 of the detached module 40 is joined to a computer USB socket 61 of the computer 60. Here, the distance between the mobile terminal 50 and the module 40 connected to the computer 60 must be in a serviceable range of the local wireless communication.

A local wireless communication environment between a mobile terminal and a computer is thereby provided by detaching a local wireless communication module combined with an antenna from the mobile terminal and assembling with a USB socket of the computer.

Accordingly, an inconvenience of carrying a data cable to connect a mobile terminal to a computer is eliminated, and an environment of data transmission between the mobile terminal and the computer is provided easily.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention, as defined in the appended claims.

What is claimed is:

1. A local wireless communication module combined with an antenna for a mobile terminal having a first local wireless communication module and a Universal Serial Bus (USB) socket, the local wireless communication module comprising:
   a USB connector;
   an RF (Radio Frequency) antenna for transmitting and receiving an RF signal when the USB connector is joined to the USB socket of the mobile terminal;
   a second local wireless communication module for executing local wireless communication with the first local wireless communication module of the mobile terminal when the USB connector is detached from the USB socket of the mobile terminal and joined to a USB socket of the computer; and
   a switch for connecting the USB connector to the RF antenna or to the second local wireless communication module according to whether the USB connector is joined to the USB socket of the mobile terminal or detached from the USB socket of the mobile terminal.

2. The local wireless communication module combined with an antenna of claim 1, further comprising a local wireless communication antenna connected to the second local wireless communication module.

3. The local wireless communication module combined with an antenna of claim 2, further comprising a module body for protection of the switch, RF antenna, second local wireless communication module, and local wireless communication antenna.

4. The local wireless communication module combined with an antenna of claim 3, wherein the USB connector protrudes outside of the module body by a predetermined length.

5. A mobile terminal comprising:
   a terminal body installed with a USB socket and a first local wireless communication module; and
   a local wireless communication module combined with an antenna, having a USB connector able to be joined to the USB socket of the mobile terminal;
   wherein the local wireless communication module combined with the antenna comprises:
   the USB connector;
   an RF antenna for transmitting and receiving an RF signal when the USB connector is joined to the USB socket of the mobile terminal;
     a second local wireless communication module for executing local wireless communication with the first local wireless communication module of the mobile terminal when the USB connector is detached from the USB socket of the mobile terminal and joined to a USB socket of the computer; and
     a switch for connecting the USB connector to the RF antenna or to the second local wireless communication module according to whether the USB connector is joined to the USB socket of the mobile terminal or detached from the USB socket of the mobile terminal.

6. The mobile terminal of claim 5, wherein the local wireless communication module combined with the antenna further comprises a local wireless communication antenna connected to the second local wireless communication module.

7. The mobile terminal of claim 6, wherein the local wireless communication module combined with the antenna further comprises a module body for protection of the switch, RF antenna, second local wireless communication module, and local wireless communication antenna.

8. The mobile terminal of claim 7, wherein the USB connector protrudes outside of the module body by a predetermined length.

9. The mobile terminal of claim 5, wherein the terminal body comprises:
   a first terminal body having the USB socket of the mobile terminal and the first local wireless communication module; and
   a second terminal body joined to the first terminal body, the second terminal body having a display unit.

10. The mobile terminal of claim 5, wherein the terminal body comprises:
   a first terminal body having the first local wireless communication module; and
   a second terminal body joined to the first terminal body, the second terminal body having a display unit and the USB socket of the mobile terminal.

11. The mobile terminal of claim 5, wherein the terminal body comprises:
   a first terminal body having the USB socket of the mobile terminal; and
   a second terminal body joined to the first terminal body, the second terminal body having a display unit and the first local wireless communication module.

12. The mobile terminal of claim 5, wherein the terminal body comprises:
   a first terminal body; and
   a second terminal body joined to the first terminal body, the second terminal body having a display unit, the USB socket of the mobile terminal, and the first local wireless communication module.

13. The mobile terminal of claim 5, wherein the USB socket is formed on an outer surface of the terminal body.

14. The mobile terminal of claim 13, further comprising a cover for surrounding the USB socket of the terminal body.

15. The mobile terminal of claim 13, wherein the mobile terminal is one of a bar type terminal, flip type terminal, folder type terminal, slide type terminal, and swing type terminal.

16. The mobile terminal of claim 5, wherein the terminal body generates an alarm if the local wireless communication module is detached and moved more than a predetermined distance away from the terminal body.

17. The mobile terminal of claim 16, wherein the terminal body generates an alarm if sensitivity of local wireless communication between the terminal body and the local wireless communication module is less than a predetermined level.

18. The mobile terminal of claim 16, wherein the predetermined distance is one meter.

* * * * *